Patented Aug. 9, 1938

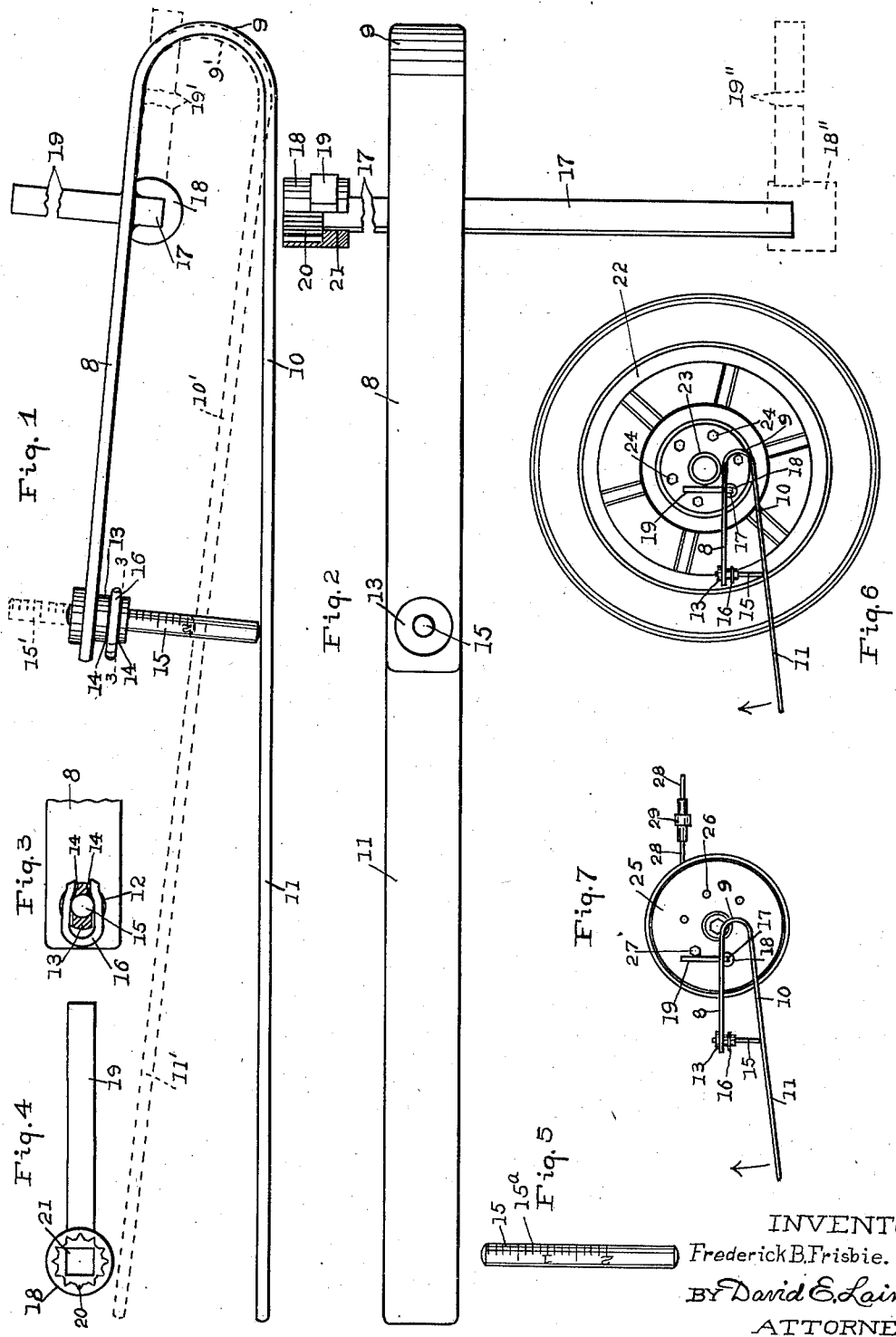

2,126,459

UNITED STATES PATENT OFFICE 2,126,459

BRAKE-DRAG MEASURING MACHINE

Frederick B. Frisbie, Seattle, Wash.

Application July 19, 1937, Serial No. 154,327

4 Claims. (Cl. 265—1)

This invention is an improvement on one for which I made application for Letters Patent Serial No. 132,123, filed March 20, 1937, which has been abandoned, relates to improvements in brake-drag measuring machines and has for an object to provide a manually-operable machine to measure the force required to revolve each of the brake bands of an automobile in order to make adjustments required to establish uniformity of brake control on each of the automobile wheels.

Another object of my invention is to provide a brake-drag measuring machine which is engageable either with an automobile wheel or with its brake housing to revolve the same.

Another object of my invention is to provide a brake-drag measuring machine which measures the resistance to revolution of each of the brake bands of an automobile in the same unit.

Another object of my invention is to provide a brake testing machine having a pressure indicator which remains in the position indicating the extreme pressure till manually removed therefrom.

Another object of my invention is to provide a brake testing machine suitable for practical use by the unskilled.

Another object of my invention is to provide a manual brake testing machine of simple and durable design and construction.

Other objects of my invention will appear as the description proceeds.

I attain these and other objects of my invention with the mechanism illustrated in the accompanying sheet of drawings, which forms a part of this specification, in which Figure 1 is a side elevation of the machine, Fig. 2 is a top plan view of Fig. 1, Fig. 3 is a bottom plan view of a fragmentary part of Fig. 1 in section on the line 3—3 of Fig. 1, Fig. 4 is a side elevation of the wrench socket and arm, Fig. 5 is an elevation view of the pressure indicator segregated, Fig. 6 is a side elevation of the right-hand front wheel of an automobile with my brake-drag measuring machine engaged therewith for revolving the wheel in a clockwise direction, and Fig. 7 is a side elevation of the brake housing the right-hand rear wheel of the said automobile with the said wheel removed therefrom showing my brake-drag measuring machine engaged for revolving the housing in a clockwise direction.

Similar characters refer to similar parts throughout. Certain parts are broken away for lack of space or to show other parts hidden thereby.

With more particular reference to the designated parts: The main part of the machine consists of a flat bar of spring steel folded over to form the frame part 8, the spring part 9 and the parts 10, 11 which serve both as a portion of the spring and for a handle. A hole 12 near the free end of the frame 8 has the bushing 13 fastened therein and its inner end extends beyond the frame and has therein two opposite lateral grooves 14, 14 which intersect the longitudinal hole through the bushing. Through the said bushing hole is extended the pressure indicating rod 15 on which is a graduated scale 15ª. The U-shape spring wire clamp 16 is extended through the grooves 14 in the bushing 13 and clamps on the pressure indicator 15 to cause friction therewith and retain the indicator in any particular place in the bushing against the application of a small force against one of its ends which otherwise would move it.

The wrench handle 17 is preferably of square cross-section and is fastened on the frame 8 at right angles therewith and its ends extend about equidistant therefrom. To the wrench socket 18 is welded one end of the bar 19 which serves as an arm thereon. The interior of the socket 18 is notched at 20 suitably to engage hexagon nuts and has the square hole 21 through which its handle 17 is extended. The socket may be engaged with its handle in each of four ways and dispose the arm 19 accordingly. The arm is shown in solid lines in Fig. 1 in one of these ways and in dotted lines at 19' in another. The socket also may be disposed on the other end of the handle 17 as shown in dotted lines at 18" with its handle at 19".

The hub cap and grease cup have been removed from the right front wheel 22, which is drawn to a smaller scale as also is the brake-drag measuring machine attached thereto. The nuts 24 which are shown are on the bolts by which the wheel is fastened to its brake housing. The socket 18 is engaged with one of the nuts 24 and its arm 19 bears on the wheel hub 23. With the testing machine thus engaged with the wheel, it is clear that pressure applied to the machine handle 11 to swing it in the direction indicated by the arrow will tend to revolve the wheel in the same direction.

Referring again to Fig. 1: If the wrench handle 17 be held in a manner to prevent it from revolving, the spring 9 and parts 10 and 11 may be moved to their dotted-line positions at 9', 10' and 11', respectively, against the resilience of the spring 9, which will move the indicator rod 15 to its dotted-line position at 15' against the slight friction caused by the spring clamp 16.

Again, in Fig. 6, if the brake on the wheel 22 be lightly set, the wheel will be prevented from turning by a considerable force. Since the socket 18 is engaged on one of the nuts 24 and its arm 19 bears on the hub 23, the wrench handle 17 holds the measuring machine engaged with the wheel when hand pressure is used on the handle 11 to force it in the direction indicated by the arrow and, although the spring 9 and parts 10 and 11 may be moved upward, as shown in Fig. 1, the frame 8 of the machine remains stationary, relative to the wheel, while the pressure indicator rod 15 is moved upward through the bushing 13. This movement of the machine parts 9, 10 and 11 will continue till the force applied to the machine handle 11 overcomes the brakes and the wheel begins to revolve when the resilience of the spring 9 will force the said machine parts back toward their solid-line positions and the indicator 15 will remain in its most advanced position under the control of the spring clamp 16. Then the number of the divisions of the scale 15ᵃ above the upper end of the bushing 13 will be a measure of the force required to overcome the wheel brakes.

In Fig. 7, which also is drawn on a smaller scale, my brake testing machine is shown engaged with the brake housing of the right-hand rear wheel of the same automobile, a wheel of which is shown in Fig. 6, the said rear wheel having been removed from the housing 25. Two of the nuts 27 of the bolts 26, with which the housing was fastened to the said wheel, have been replaced on the bolts and the wrench socket 18 has been engaged with one of the nuts while its arm 19 bears on the other nut. With the previous explanations in mind, it is clear that by forcing the machine handle upward towards the stationary wrench handle 17 the spring 9 will be flexed till the brake resistance is overcome and the brake housing begins to revolve. Then the reaction of the spring 9 will force the handle 11 and part 10 back toward their illustrated positions and the indicator rod 15 will again be retained in its most advanced position by the spring 16, when the number of the divisions of the scale 15ᵃ above the bushing 13 will be a measure of the force required to overcome the brake resistance against the revolution of the brake housing 25. In a similar way the brakes on the left hand side of the car are tested, the only change desirable in the brake testing machine being to transfer the brake socket 18 from its solid-line position in Fig. 2 to its dotted-line position at 18''.

With a measure of the brake resistance of each of the automobile wheel brakes in similar units, as read from the scale 15ᵃ, the locations of the brake mechanism needing adjustment are made known and the needed adjustments are made; following which each of the brakes are again tested by the machine to learn the degree of similarity to which they have been brought.

The adjustable parts of the brake mechanism pertaining to the front wheels of an automobile are quite accessible when the wheels are in place, but the adjustments needed to correct brake pressure on rear wheels are more easily made when the wheels are removed. For this reason it is desirable to use a brake testing machine which is designed for engagement either with a wheel or with its brake housing. In Fig. 7 the brake rod 28 and turnbuckle 29 thereof are shown in about their usual place, and the greater convenience for turning the turnbuckle when the wheel is removed is evident.

Having thus disclosed my invention, what I claim as new therein and desire to secure by Letters Patents is,—

1. A brake-drag measuring machine including, a combined machine frame, spring and machine handle in a folded-over bar, a wrench handle fastened transversly on the said frame, a pressure-indicating rod mounted for reciprocation on the said frame disposed to contact the said machine handle by reciprocation, and a wrench socket engageable on the said wrench handle.

2. A brake-drag measuring machine including, a combined machine frame, spring and machine handle in a folded-over bar, a wrench handle fastened transversly on the said frame, a pressure-indicating rod mounted for reciprocation on the said frame disposed to contact the said machine handle by reciprocation, a wrench socket engageable with the said wrench handle, and an arm fastened on the said wrench socket.

3. A brake-drag measuring machine including, a combined machine frame, spring and machine handle in a folded-over bar, a wrench handle fastened transversly on the said frame, a pressure-indicating rod having a graduated scale thereon mounted for reciprocation on the said frame disposed to contact the said machine handle by reciprocation, and a wrench socket engageable with the said wrench handle.

4. A brake-drag measuring machine including a machine frame, spring and machine handle in a folded-over bar, a wrench handle fastened transversly on the said frame, a pressure-indicating rod mounted for reciprocation on the said frame disposed to contact the said machine handle by reciprocation, means to retain the said rod from reciprocation against a small opposing force, and a wrench socket engageable with the said wrench handle.

FREDERICK B. FRISBIE.